United States Patent
Myran et al.

(10) Patent No.: US 10,496,334 B2
(45) Date of Patent: Dec. 3, 2019

(54) SOLID STATE DRIVE USING TWO-LEVEL INDIRECTION ARCHITECTURE

(71) Applicant: Western Digital Technologies, Inc., San Jose, CA (US)

(72) Inventors: Mark David Myran, Trabuco Canyon, CA (US); Chandan Mishra, Irvine, CA (US); Amir Hossein Gholamipour, Anaheim, CA (US); Aldo Giovanni Cometti, San Diego, CA (US); Namhoon Yoo, Anaheim, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/971,869

(22) Filed: May 4, 2018

(65) Prior Publication Data

US 2019/0339904 A1   Nov. 7, 2019

(51) Int. Cl.
*G06F 12/02* (2006.01)
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/0688* (2013.01); *G06F 12/0246* (2013.01); *G06F 12/1009* (2013.01); *G06F 2212/1008* (2013.01); *G06F 2212/657* (2013.01)

(58) Field of Classification Search
None
See application file for complete search history.

(56) References Cited

U.S. PATENT DOCUMENTS 6,377,500 B1 * 4/2002 Fujimoto ............ G06F 12/0246
                                                    365/230.01
7,734,891 B2 * 6/2010 Wong .................. G06F 12/0246
                                                        711/103

(Continued)

OTHER PUBLICATIONS

Shimpi, Anand Lal; "The Intel SSD DC S3700: Intel's 3rd Generation Controller Analyzed: A Brand New Architecture"; Nov. 5, 2012; https://www.anandtech.com/show/6432/the-intel-ssd-dc-s3700-intels-3rd-generation-controller-analyzed/2; 4 pages.

(Continued)

*Primary Examiner* — Kaushikkumar M Patel
(74) *Attorney, Agent, or Firm* — Loza & Loza, LLP; Gabriel Fitch (57) ABSTRACT

Aspects of the present disclosure provide systems and methods for operating a solid state drive (SSD) using two-level indirection architecture. The SSD receives a command to perform a data operation in a NAND array and a logical address for the data operation. The SSD then converts the logical address to a physical address using a two-stage logical-to-physical (L2P) mapping table that includes a first stage stored in a byte-rewritable memory and a second stage stored in a block-erasable non-volatile memory (NVM). The SSD performs the data operation in the NAND array based on the physical address. The byte-rewritable memory may any byte-rewritable persistent memory. The block-erasable low latency NVM may be a flash memory that has lower latency than NAND array.

21 Claims, 10 Drawing Sheets

(56) References Cited

U.S. PATENT DOCUMENTS

| | | | |
|---|---|---|---|
| 8,935,458 B2 | 1/2015 | Royer, Jr. et al. | |
| 9,037,820 B2 | 5/2015 | Ratn et al. | |
| 9,405,621 B2 | 8/2016 | Yu et al. | |
| 9,720,605 B2 | 8/2017 | Lin et al. | |
| 10,175,889 B2* | 1/2019 | Aga | G06F 3/0611 |
| 2011/0283048 A1* | 11/2011 | Feldman | G06F 3/0611 |
| | | | 711/103 |
| 2012/0239855 A1* | 9/2012 | Tootoonchian | G06F 12/0246 |
| | | | 711/103 |
| 2014/0143476 A1* | 5/2014 | Sela | G06F 3/0619 |
| | | | 711/103 |
| 2014/0281145 A1 | 9/2014 | Tomlin et al. | |
| 2015/0347026 A1* | 12/2015 | Thomas | G06F 3/0611 |
| | | | 711/103 |
| 2016/0098355 A1* | 4/2016 | Gorobets | G06F 12/1009 |
| | | | 711/203 |
| 2017/0075807 A1 | 3/2017 | Tomlin et al. | |
| 2017/0235681 A1* | 8/2017 | Kaburaki | G06F 12/0292 |
| | | | 711/128 |

OTHER PUBLICATIONS

Shimpi, Anand Lal; "The Intel SSD DC S3700: Intel's 3rd Generation Controller Analyzed: The New Indirection Table"; Nov. 5, 2012; https://www.anandtech.com/show/6432/the-intel-ssd-dc-s3700-intels-3rd-generation-controller-analyzed/3; 2 pages.

* cited by examiner

SOLID STATE DRIVE USING TWO-LEVEL INDIRECTION ARCHITECTURE

FIELD

Aspects of the disclosure relate generally to a data storage device, and more specifically, to a solid state drive.

INTRODUCTION

A solid-state drive (SSD) is a data storage device that uses solid state memory to store data persistently. An SSD typically uses NAND flash memory or the like as the main data storage. The physical flash memory cells of NAND flash memory are typically arranged as blocks each containing a number of pages. A block may include a large number of pages (e.g., 256 or 512). NAND flash is erasable at the block level, and programmed (i.e., written to) or read at the page level. A physical page in an SSD cannot be directly overwritten until the enclosing block has first been erased, which erases the data in other pages within the same block. As a result, a typical SSD uses address indirection to manage how data is programmed or written to the SSD. When the SSD receives data for a logical address, a controller of the SSD causes the new data to be written in a new freshly erased location and updates the logical-to-physical address mapping to associate the specified logical address with the new physical location. After the update, the old physical location (e.g., page) no longer holds valid data and it will eventually be erased in order to be used to hold valid data again.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide systems and methods for operating a solid state drive using two-level indirection architecture.

In one embodiment, a method of operating a solid state drive (SSD) is provided. The SSD receives a command to perform a data operation in a NAND array and a logical address for the data operation. The SSD then converts the logical address to a physical address using a two-stage logical-to-physical (L2P) mapping table that includes a first stage stored in a byte-rewritable memory and a second stage stored in a block-erasable non-volatile memory (NVM). In some examples, the byte-rewritable memory may be magnetoresistive random access memory (MRAM), phase-change memory (PCM), resistive random-access memory (ReRAM), storage-class memory (SCM), and any byte-rewritable persistent memory. In some examples, the block-erasable NVM may be a low latency flash memory. The method concludes with the SSD performing the data operation in the NAND array based on the physical address.

In another embodiment, a solid state device (SSD) includes a communication interface configured to communicate with a host, a NAND array, a byte-rewritable memory, a NVM, and a controller operatively coupled with the communication interface and the NAND array. In some examples, the byte-rewritable memory may be MRAM, PCM, ReRAM, SCM, and any byte-rewritable persistent memory. In some examples, the block-erasable NVM may be a low latency flash memory.

The controller is configured to receive, from the host, a command to perform a data operation in the NAND array and a logical address for the data operation. Then, the controller converts the logical address to a physical address using a two-stage L2P mapping table including a first stage stored in the byte-rewritable memory and a second stage stored in the block-erasable NVM. The controller then performs the data operation in the NAND array based on the physical address.

In another embodiment, a solid state drive (SSD) is provided. The SSD includes means for receiving a command to perform a data operation in a NAND array and a logical address for the data operation. The SSD further includes means for converting the logical address to a physical address using a two-stage L2P mapping table including a first stage stored in a byte-rewritable memory and a second stage stored in a block-erasable non-volatile memory (NVM). The SSD further includes means for performing the data operation in the NAND array based on the physical address.

In another embodiment, a solid state drive (SSD) is provided. The SSD includes a NAND array, a byte-rewritable memory, a block-erasable NVM, and a controller operatively coupled with the NAND array, the byte-rewritable memory, and the block-erasable NVM. The controller is configured to store first data in the NAND array using a two-stage L2P mapping table including a partition table and a plurality of table partitions. The controller is further configured to store the partition table in the byte-rewritable memory. The partition table includes a plurality of indexes corresponding to the plurality of table partitions. The controller is further configured to store the plurality of table partitions in the block-erasable NVM. Each table partition includes a plurality of physical addresses of the NAND mapped to logical addresses of the first data.

DETAILED DESCRIPTION

Referring now to the drawings, systems and methods are provided for operating a solid state drive (SSD) using a two-stage logical-to-physical (L2P) address mapping table (also referred to as an L2P table). In some embodiments, the two-stage L2P table is stored using byte-writable memory for the first stage and block-erasable persistent memory for the second stage. Some embodiments allow the L2P table to be stored without using volatile data storage media. In some embodiments, storing the L2P table on two levels of persistent memory or storage can reduce the complexity and processes needed to rebuild the L2P table due to power failure or during initial power up of the SSD. In some embodiments, the first stage of the L2P table can be stored in a byte addressable persistent memory that can facilitate buffering/caching solutions, which in turn can significantly reduce L2P table accesses in terms of both reads and writes in certain SSD implementations.

Figure 1:
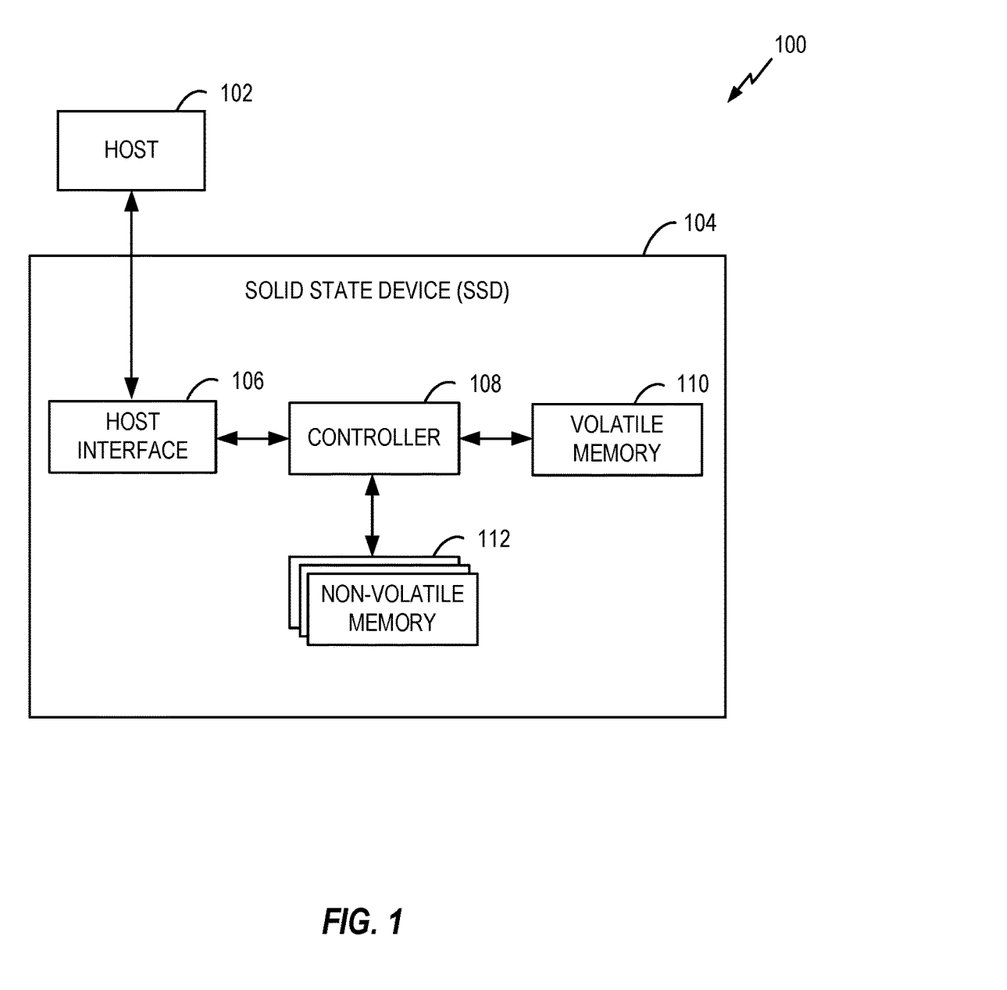
FIG. 1. is a diagram illustrating a computing system including a host and a solid state drive (SSD) in accordance with some embodiments of the disclosure.

FIG. 1 is a block diagram illustrating a computing system 100 in accordance with some embodiments of the disclosure. The system 100 includes a host 102 and a solid state device (SSD) 104 coupled to the host 102. The host 102 provides various commands to the SSD 104 for transferring data between the host 102 and the SSD 104. For example, the host 102 may provide a write command to the SSD 104 for writing or programming data to the SSD 104, a read command to the SSD 104 for reading or retrieving data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, a digital phone, or the like. In some embodiments, the SSD 104 includes a host interface 106, a controller 108, a volatile memory 110, and a non-volatile memory (NVM) 112.

An SSD controller (e.g., controller 108) may use a logical-to-physical (L2P) address mapping system to access a main NAND storage (e.g., NVM 112). The SSD controller maintains an L2P mapping table that maps logical addresses (e.g., logical block addresses or LBAs) to physical addresses (e.g., physical block addresses or PBAs) on the NAND storage. The controller typically keeps the L2P table in a volatile memory such as dynamic random access memory (DRAM) during the operation of the SSD. The SSD controller updates the L2P mapping table when writes occur, and may save the table or some sections of the table to the NVM (e.g., flash memory). As the size of SSD gets increasing larger, it becomes difficult and inefficient to maintain the L2P mapping table in expensive volatile memory like DRAM. Moreover, it takes longer to rebuild the L2P table of a large capacity SSD after power-on or power failure.

Figure 2:
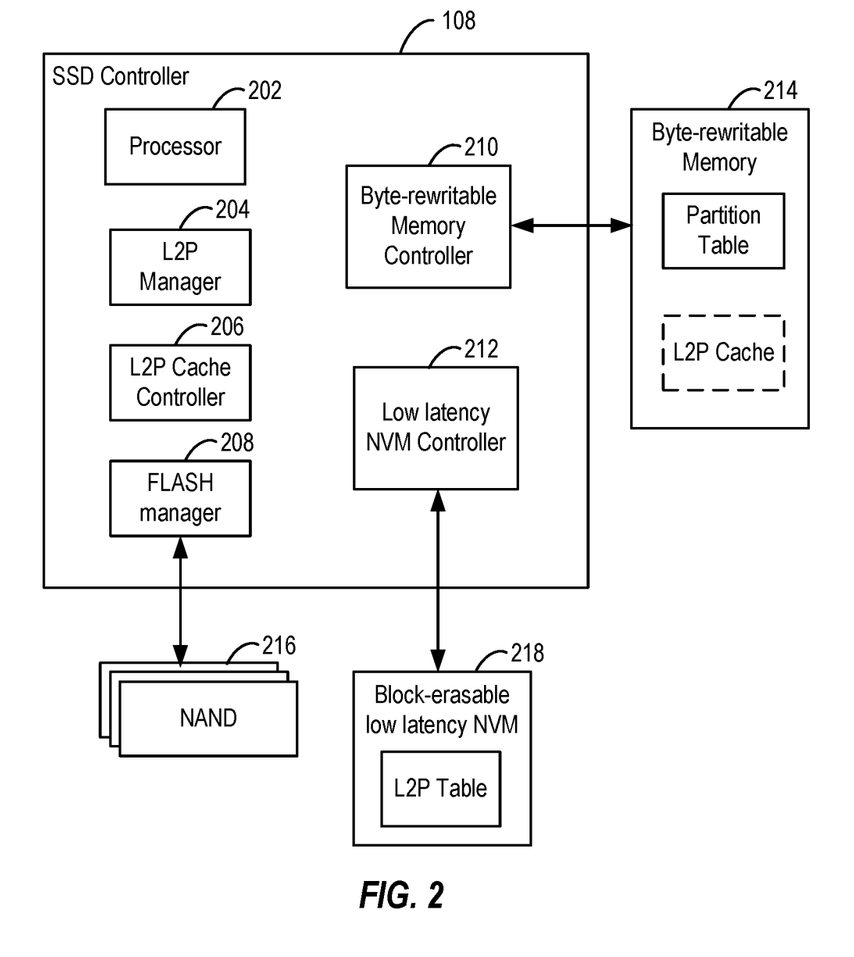
FIG. 2 is a block diagram illustrating the SSD of FIG. 1 in more detail in accordance with some embodiments of the disclosure.

FIG. 2 is a block diagram illustrating the SSD of FIG. 1 in more detail in accordance with some embodiments of the disclosure. The SSD controller 108 may include various components, for example, a processor 202, a logical-to-physical (L2P) manager 204, an L2P cache controller 206, a flash manager 208, a byte-rewritable memory controller 210, and a low latency NVM controller 212. In some examples, the low latency NVM controller 212 may be called a Low Latency Flash (LLF) controller. While these components are illustrated as separate blocks in FIG. 2, some or all of these components may be combined into a same unit or multiple units that may be implemented using various combinations of software and hardware. Exemplary circuitry that can be used to implement the SSD controller 108 include, for example, microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 202 may include one or more circuits configured to perform various functions including, for example, arithmetic, logical, control, and input/output (I/O) operations. In some examples, the processor 202 may include an arithmetic logic unit (ALU) that performs arithmetic and logic operations, processor registers and/or buffers that supply operands to the ALU and store the results of ALU operations, and a control unit that fetches instructions from memory and executes the instructions using the ALU, registers and/or other components. The L2P manager 204 may be configured to perform various L2P address mapping functions described throughout this disclosure. The L2P cache controller 206 may be configured to perform various functions to maintain an L2P cache that may be stored in the byte-rewritable memory 214. Some non-limiting examples of the byte-rewritable memory 214 are magnetoresistive random access memory (MRAM), phase-change memory (PCM), resistive random-access memory (ReRAM), storage-class memory (SCM), and any byte-rewritable persistent memory. The byte-rewritable memory 214 may store a partition table for facilitating a two-stage L2P address redirection that is described in more detail below in relation to FIGS. 3-10.

The flash manager 208 may be configured to perform various functions, for example, to program, erase, and read one or more a NAND storage or array 216. The NAND storage 216 may be used as the main storage for user data. The byte-rewritable memory controller 210 may be configured to perform various functions, for example, to read and write the byte-rewritable memory 214. In some embodiments, the byte-rewritable memory 214 may be replaced by dynamic random access memory (DRAM) or the like (e.g., volatile memory 110). The low latency NVM controller 212 may be configured to perform various functions, for example, to program, erase, and read a block-erasable low latency NVM 218. The block-erasable low latency NVM 218 has faster access (e.g., 10 times or more faster in program, read, and/or erase operations) than the NAND flash 216 that provides the main data storage of the SSD. The block-erasable low latency NVM 218 may have less storage capacity than the NAND flash 216. In some examples, the block-erasable low latency NVM 218 may be used to store metadata of the SSD, not user data. In one embodiment, the block-erasable NVM 218 stores a plurality of L2P table partitions to facilitate two-stage L2P address redirection that is described in more detail below in relation to FIGS. 3-10. In a non-limiting example, the block-erasable low latency NVM 218 may be faster NAND or other block-erasable persistent storage that has faster access (e.g., read, program, and/or erase) than the NAND flash 216. In some embodiments, the NAND flash 216 and block-erasable low latency NVM 218 are included in the non-volatile memory 112 of FIG. 1.

Figure 3:
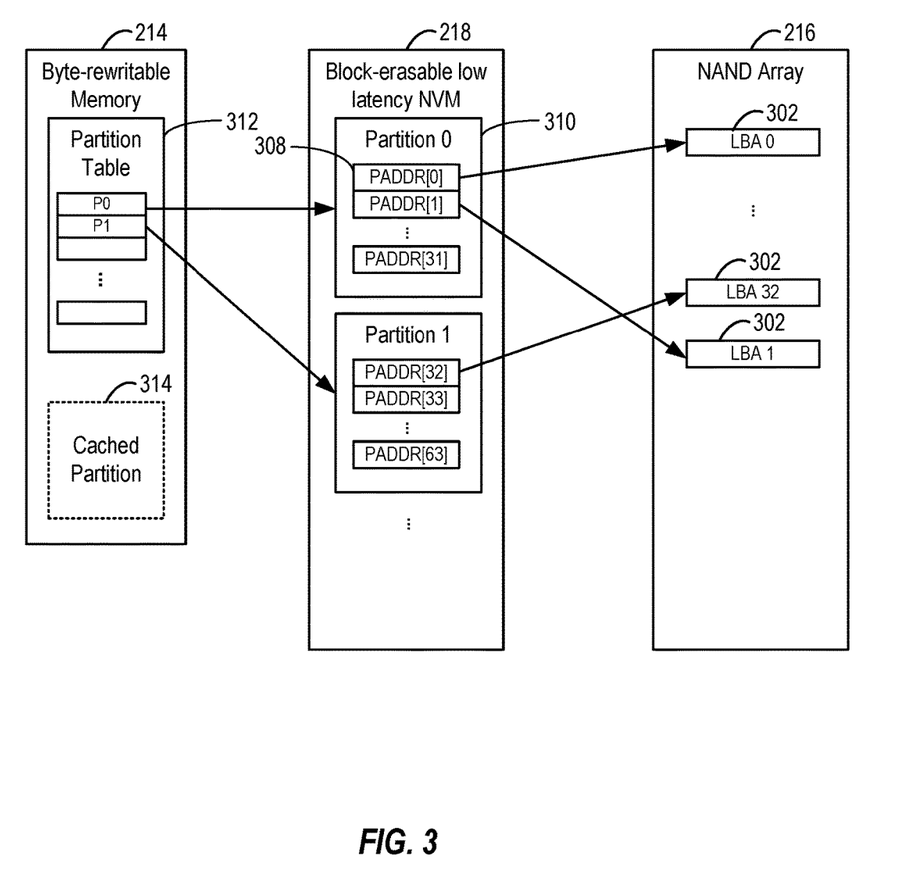
FIG. 3 is a block diagram illustrating a two-stage logical-to-physical (L2P) address mapping architecture in accordance with some embodiments of the disclosure.

FIG. 3 is a block diagram illustrating a two-stage L2P address mapping architecture in accordance with some embodiments of the disclosure. This L2P mapping architecture uses two levels of persistent storage to store the L2P mapping table of the NAND array 216, instead of using volatile memory such as DRAM or the like. In one embodiment, the first level is the byte-rewritable memory 214, and the second level is a block-erasable NVM 218. The block-erasable low latency NVM 218 has faster access time (e.g., 10 times or more faster to program, read, and/or erase) than the NAND array 216. Using persistent storage (e.g., NVM or NAND) to store an L2P table can reduce the processing time needed to rebuild the L2P table after power up or power failure. In some embodiments, it is possible to store the first stage of the L2P table using volatile memory, while still using persistent storage (e.g., block-erasable NVM 218) for storing the second stage of the L2P table.

Using indirection addressing, the host 102 may use a logical block address (LBA) to address data stored in the NAND array 216, and each logical address maps to the physical address of a single block of data 302 (e.g., LBA 0, LBA 1, and LBA 32 are illustrated in FIG. 3) that is stored in the NAND array 216. Using address indirection, the host does not need to know the physical addresses wherein the blocks of data are stored in the NAND array 216. The physical addresses (L2P table entries) of the data are stored in the block-erasable low latency NVM 218. The L2P table entries are grouped into table partitions. For example, two partitions (partition 0 and partition 1) are illustrated in FIG. 3. In one embodiment, a table partition includes a group of 32 linear L2P table entries. In one example, the first L2P entry (e.g., PADDR[0]) in table partition 0 stores the physical address of LBA 0.

When data is updated or overwritten in the NAND array 216, the SSD controller writes the new data to a new physical location (e.g., page) because the NAND array 216 is not in-place byte-rewritable. To that end, the SSD controller updates the corresponding L2P table entry (i.e., a pointer to a physical address) to reflect the changed physical address. Each table partition may be stored in one or more pages of the block-erasable NVM 218. When the SSD controller updates one or more L2P entries of a table partition 310, the SSD controller may write the updated table partition to a new page of the block-erasable NVM 218 because it is not in-place rewritable. In that case, the SSD controller updates a partition table 312 stored in the byte-rewritable memory 214. The partition table 312 keeps track of the addresses or locations of the table partitions in the block-erasable NVM 218.

In some embodiments, the SSD controller may cache one or more table partitions 314 in the byte-rewritable memory 214. The SSD may select the partition(s) to be cached based on a known access pattern to the L2P table in response to a host read or write operation. Caching the partitions can reduce access (e.g., reading and/or writing) of the block-erasable NVM 218. That can reduce the number of dies used to meet certain performance and endurance requirement.

Figure 4:
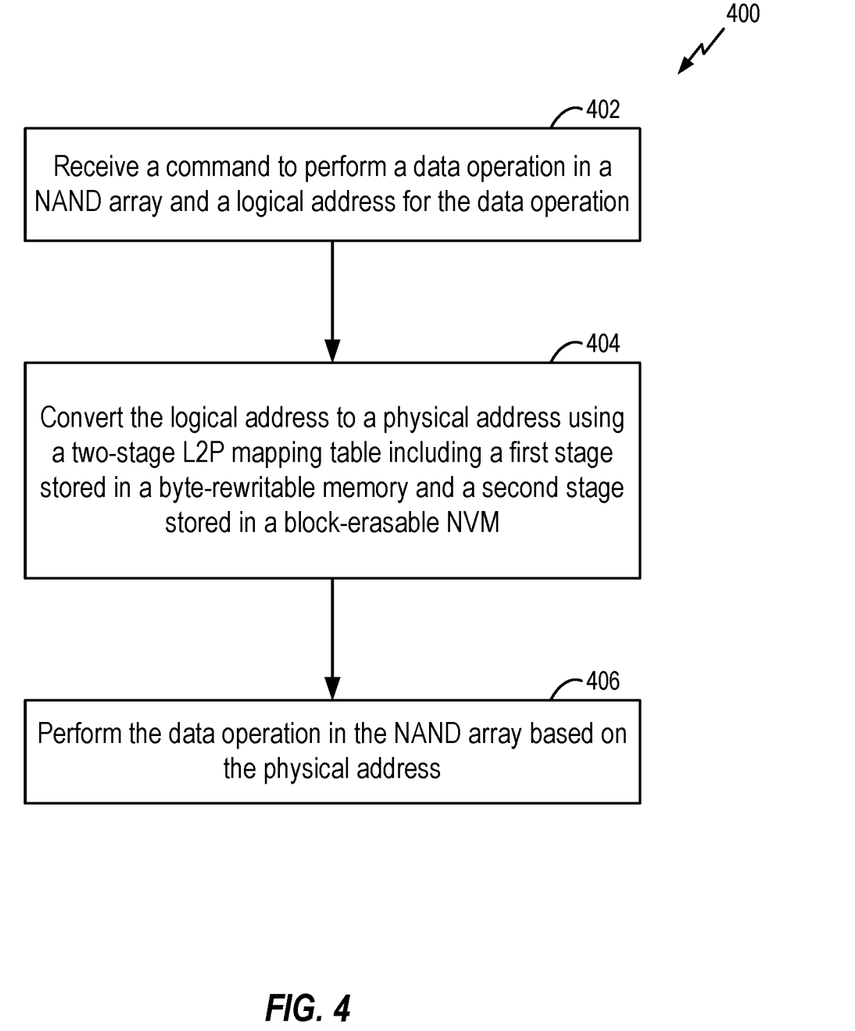
FIG. 4 is a flow chart illustrating a method for performing a data operation in a NAND array using a two-stage L2P mapping table in accordance with some embodiments.

FIG. 4 is a flow chart illustrating a method 400 for performing a data operation in the NAND array 216 using a two-stage L2P mapping table in accordance with some embodiments. In one example, this method 400 may be performed by the SSD controller 108. In some embodiments, the method 400 may be performed by any devices configured for controlling a NAND array.

At block 402, the SSD controller (e.g., processor 202) receives a command to perform a data operation in a NAND array and a logical address for the data operation. For example, the data operation may be a program operation for writing data to a page of the NAND array or a read operation to read data from a page of the NAND array. The SSD controller may receive the command from the host 102 (see FIG. 1) via the host interface 106. The host interface 106 may be a wireless or wired interface. Some exemplary interfaces are Peripheral Component Interconnect (PCI) interface, Universal Serial Bus (USB) interface, Firewire, Thunderbolt, etc. The logical address is mapped to a physical address of the NAND array using a two-stage L2P mapping table as described in relation to FIG. 3.

At block 404, the SSD controller (e.g., processor 202) converts the logical address to a physical address using a two-stage L2P mapping table. The L2P mapping table includes a first stage stored in a byte-rewritable memory and a second stage stored in a block-erasable NVM. In some embodiments, the first stage of the L2P mapping table may be the partition table 312 that is stored in the byte-rewritable memory 214. The second stage of the L2P mapping table may be the table partitions 310 that are stored in the block-erasable NVM 218. In some embodiments, the first stage of the L2P mapping table may be stored in byte-rewritable volatile storage (e.g., DRAM).

At block 406, the SSD controller performs the data operation in the NAND array based on the physical address. In one example, the SSD controller reads from the NAND array data stored at the physical address. In another example, the SSD controller programs (i.e., write) data to the NAND array to update data stored at the physical address. To that end, the SSD controller (e.g., FLASH manager 208) writes the new data to a new page at a new physical address and marks the data at the old physical address invalid.

Figure 5:
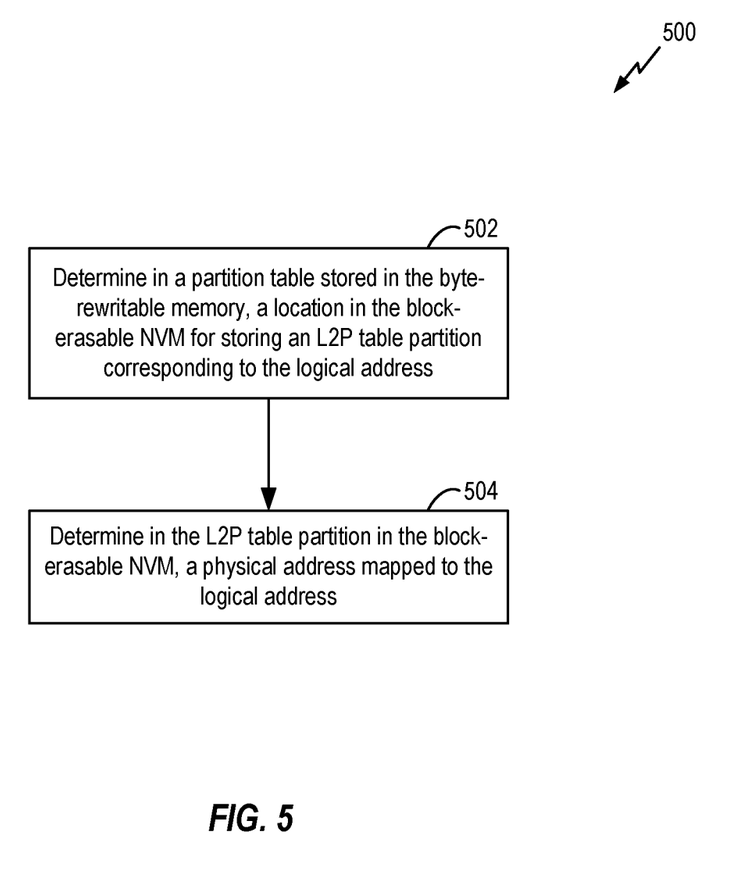
FIG. 5 is a flow chart illustrating a process for converting a logical address to a physical address using a two-stage L2P mapping table in accordance with some embodiments.

FIG. 5 is a flow chart illustrating a process 500 for converting a logical address to a physical address using a two-stage L2P mapping table in accordance with some embodiments. In one example, the SSD controller 108 may perform this process 500 at block 404 of FIG. 4. At block 502, the SSD controller can determine in a partition table 312 stored in the byte-rewritable memory 214, a location in the block-erasable NVM 218 for storing an L2P table partition that stores the L2P entry for the logical address. For example, with reference to FIG. 2, the partition table entry P0 points to the L2P table partition 0 that stores the L2P entry for LBA 0 in the NAND array. Then, at block 504, the SSD controller can determine in the L2P table partition a physical address (e.g., PADDR[0]) mapped to the logical address.

Figure 6:
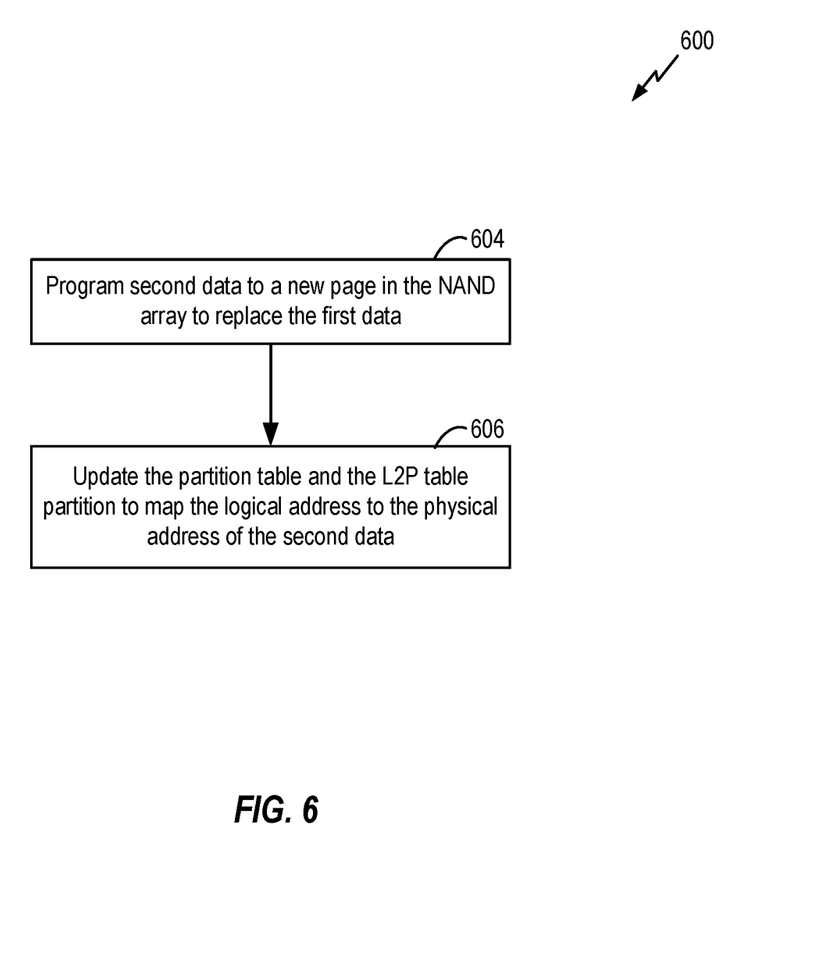
FIG. 6 is a flow chart illustrating a process for updating data stored in a NAND array in accordance with some embodiments.

FIG. 6 is a flow chart illustrating a process 600 for updating data stored in a NAND array in accordance with some embodiments. In one example, the SSD controller 108 may perform this process 600 at block 406 of FIG. 4. It is assumed that the SSD controller has already converted a logical address to a physical address using the 2-stage L2P mapping table described in relation to FIG. 2. At block 604, the SSD controller programs second data to a new page in the NAND array. The second data replaces (i.e., updates) the first data. At block 606, the SSD controller updates the partition table 312 and the L2P table partition 310 to map the logical address to the new physical address of the second data (updated data).

Figure 7:
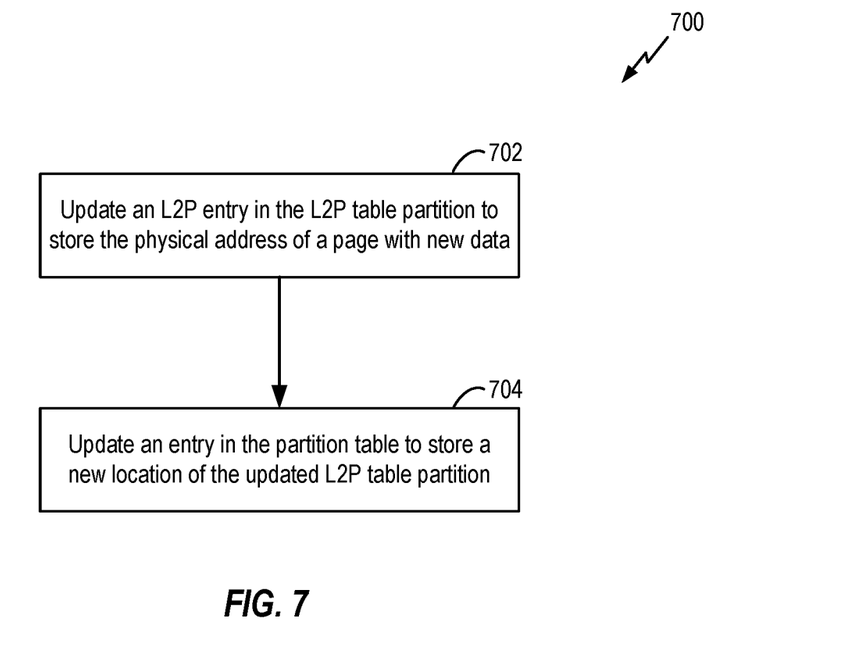
FIG. 7 is a flow chart illustrating a process for updating a two-stage L2P mapping table for storing data in a NAND array in accordance with some embodiments.

FIG. 7 is a flow chart illustrating a process 700 for updating a two-stage L2P mapping table for storing data in a NAND array in accordance with some embodiments. In one example, the SSD controller 108 may perform this process 700 at block 606 of FIG. 6. At block 702, the SSD controller updates an L2P table entry in the table partition 310 to store the physical address of a page with new data or updated data. For example, the new data may belong to the logical address LBA 1 stored in the NAND array 216. In this case, the SSD controller stores the new physical address corresponding to LBA 1 in the table entry PADDR[1] in table partition 0. In some examples, the SSD may need to relocate the table partition 0 in order to update it. At block 704, the SSD controller may update an entry in the partition table to store a new location of the updated L2P table partition. Because the partition table is stored in a byte-rewritable memory 214, the SSD controller can easily update the partition table in place.

Figure 8:
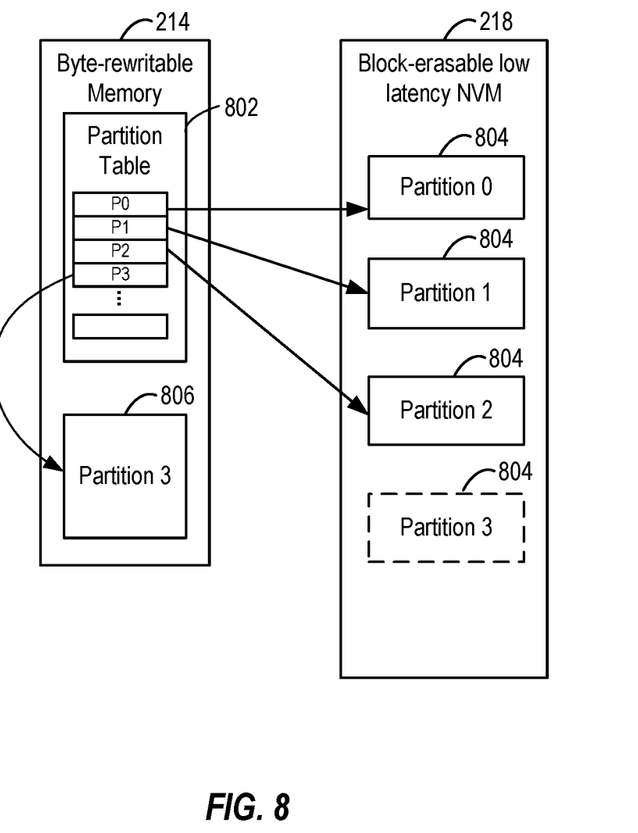
FIG. 8 is a block diagram illustrating an L2P table partition caching method in accordance with some embodiments.

FIG. 8 is a block diagram illustrating an L2P table partition caching method in accordance with some embodiments. In one embodiment, the method may be performed using the byte-rewritable memory 214 and block-erasable NVM 218, which are described above in relation to FIG. 2. In this example, a partition table 802 is used to index a plurality of L2P table partitions stored in the block-erasable NVM 218. Some exemplary table partitions 804 (illustrated as partition 0, partition 1, partition 2, and partition 3 in FIG. 8) are maintained in the block-erasable NVM 218. To speed up access of the L2P table partitions, one or more L2P table partitions (e.g., partition 3) may be cached in the byte-rewritable memory 214, which has faster access than the block-erasable low latency NVM 218. After a table partition is cached in the byte-rewritable memory 214, the partition table index points to the cached table partition instead of the block-erasable NVM 218. Therefore, access to the block-erasable NVM 218 may be reduced.

Figure 9:
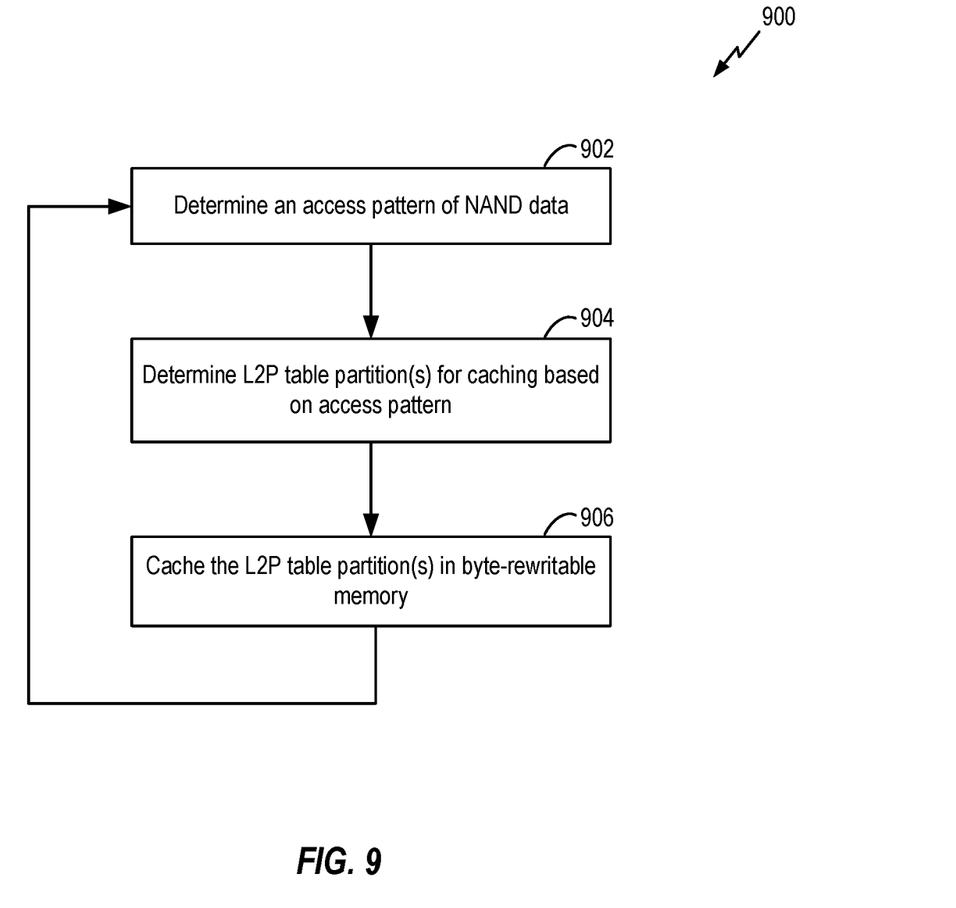
FIG. 9 is a flow chart illustrating a two-stage L2P mapping table caching method in accordance with some embodiments.

FIG. 9 is a flow chart illustrating a two-stage L2P mapping table caching method in accordance with some embodiments. For example, at block 902, the SSD controller 108 determines an access pattern of user data stored in the NAND array 216. The SSD controller 108 may determine the access pattern based on historical access data or receive the access pattern from the host 102. At block 904, the SSD controller 108 determines the L2P table partition(s) for caching based on the access pattern of the NAND array. For example, if a certain L2P table partition was accessed in a predetermined period according to the historical access data, the controller SSD 108 may cache that particular L2P table partition in the byte-rewritable memory 214. At block 906, the SSD controller 108 caches one or more L2P table partitions in the byte-rewritable memory. Caching frequently accessed L2P table partitions in the byte-rewritable memory can reduce access (e.g., read/write) of the block-erasable low latency NVM 218. The SSD controller 108 may repeat the above process to add and/or remove cached L2P table partitions. In one example, a single host write may generate an access sequence of read, write, read, write, and read to the corresponding L2P entry. In that case, the corresponding table partition gets cached on the first read of the sequence, then flushed following the final read of the sequence.

Figure 10:
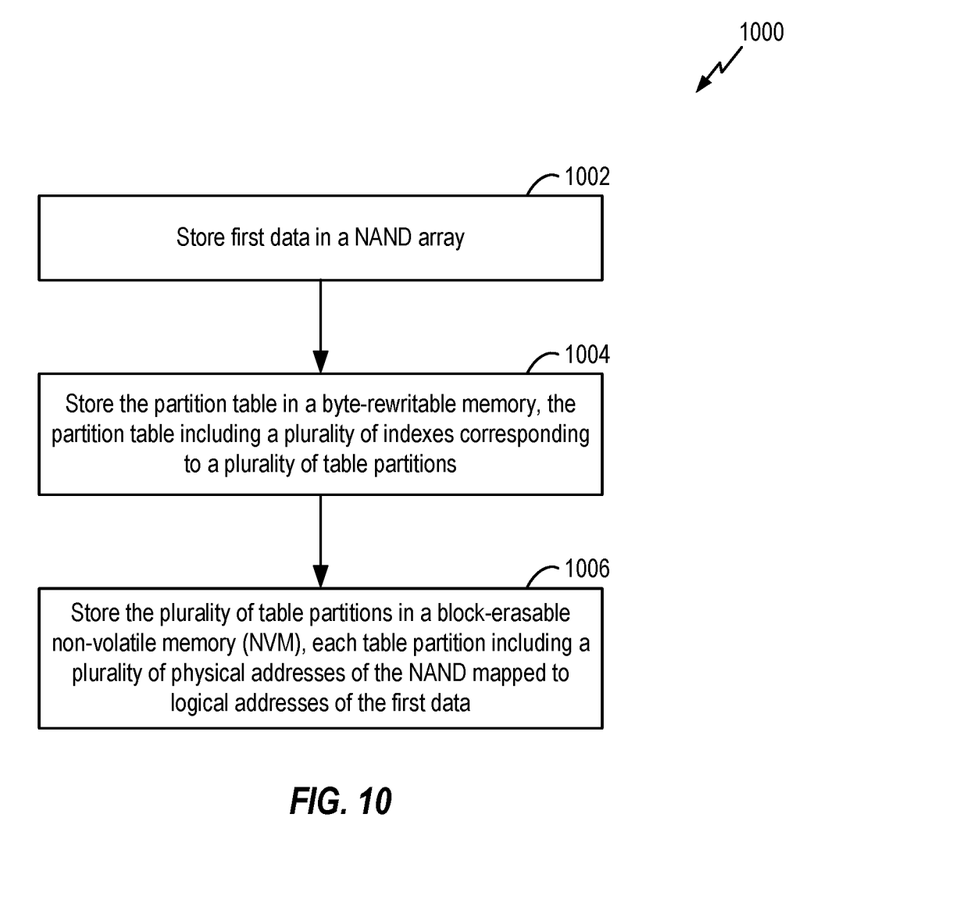
FIG. 10 is a flow chart illustrating a method for maintaining a two-stage L2P mapping table for a NAND array in accordance with some embodiments.

FIG. 10 is a flow chart illustrating a method for maintaining a two-stage L2P mapping table in accordance with some embodiments. In one embodiment, the SSD controller 108 may perform the method 1000 using the byte-rewritable memory 214 and block-erasable NVM 218, which are described above in relation to FIG. 2. At block 1002, the SSD controller 108 stores first data in a NAND array 216. For example, the SSD controller 108 may store the first data (e.g., user data) in one or more pages of the NAND array 216 using a two-stage L2P mapping table as described above. At block 1004, the SSD controller 108 stores an L2P partition table 312 in the byte-rewritable memory 214. The partition table 312 includes a plurality of indexes (e.g., P0, P1, P2 . . . ) corresponding to the plurality of table partitions 310 (see FIG. 3). At block 1006, the SSD controller 108 stores the plurality of table partitions 310 in a block-erasable NVM 218. In some examples, the block-erasable NVM has faster access time and smaller size than the NAND array 216. Each L2P table partition 310 includes a plurality of physical addresses of the NAND array mapped to corresponding logical addresses of the first data.

The above-described methods and processes may be used individually or in any combinations including one or more of the methods and procedures described in relation to FIGS. 1-10.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of operating a solid state drive (SSD), comprising:
   receiving a command to perform a data operation in a NAND array and a logical address for the data operation;
   converting the logical address to a physical address using a two-stage logical-to-physical (L2P) mapping table comprising a partition table stored in a byte-rewritable non-volatile memory and a plurality of L2P table partitions stored in a block-erasable non-volatile memory (NVM) that has faster access than the NAND array; and
   performing the data operation in the NAND array based on the physical address.

2. The method of claim 1,
   wherein the converting comprises:
      determining, using the partition table, a location in the block-erasable NVM storing the L2P table partition corresponding to the logical address for the data operation; and
      determining, using the L2P table partition, the physical address for performing the data operation in the NAND array.

3. The method of claim 2, wherein the performing the data operation comprises:

programming second data, received as part of the command, to the NAND array to replace first data stored in the NAND array; and updating the partition table and the L2P table partition to map the logical address to a physical address of the second data.

4. The method of claim 3, wherein the updating comprises:

updating an L2P entry in the L2P table partition to store the physical address of the second data; and updating an entry in the partition table to store a new location of the updated L2P table partition.

5. The method of claim 1, wherein the command comprises, at least one of:

a program command for writing data to a page of the NAND array; or a read command for reading data from a page of the NAND array.

6. The method of claim 1, wherein:

the partition table comprises a plurality of partition indexes, wherein each partition index indicates a location of a corresponding one of the L2P table partitions in the block-erasable NVM.

7. A solid state device (SSD) comprising:

a communication interface configured to communicate with a host;

a NAND array;

a byte-rewritable non-volatile memory;

a block-erasable non-volatile memory (NVM) that has faster access than the NAND array; and a controller operatively coupled with the communication interface and the NAND array, wherein the controller is configured to:

receive, from the host, a command to perform a data operation in the NAND array and a logical address for the data operation;

convert the logical address to a physical address using a two-stage logical-to-physical (L2P) mapping table comprising a partition table stored in the byte-rewritable non-volatile memory and a plurality of L2P table partitions stored in the block-erasable NVM; and perform the data operation in the NAND array based on the physical address.

8. The SSD of claim 7, wherein the controller is further configured to:

determine, using the partition table, a location in the block-erasable NVM storing the L2P table partition corresponding to the logical address for the data operation; and determine, using the L2P table partition, the physical address for performing the data operation in the NAND array.

9. The SSD of claim 8, wherein the controller is further configured to:

program second data, received as part of the command, to the NAND array to replace first data stored in the NAND array; and update the partition table and the L2P table partition to map the logical address to a physical address of the second data.

10. The SSD of claim 9, wherein the controller is further configured to:

update an L2P entry in the L2P table partition to store the physical address of the second data; and update an entry in the partition table to store a new location of the updated L2P table partition.

11. The SSD of claim 7, wherein the command comprises, at least one of:

a program command for writing data to a page of the NAND array; or a read command for reading data from a page of the NAND array.

12. The SSD of claim 7, wherein:

the partition table comprises a plurality of partition indexes, and wherein each partition index indicates a location of a corresponding one of the L2P table partitions in the block-erasable NVM.

13. A solid state drive (SSD), comprising:

means for receiving a command to perform a data operation in a NAND array and a logical address for the data operation;

means for converting the logical address to a physical address using a two-stage logical-to-physical (L2P) mapping table comprising a partition table stored in a byte-rewritable non-volatile memory and a plurality of L2P table partitions stored in a block-erasable non-volatile memory (NVM) that has faster access than the NAND array; and means for performing the data operation in the NAND array based on the physical address.

14. The SSD of claim 13, wherein the means for converting is configured to:

determine, using the partition table a location in the block-erasable NVM storing the L2P table partition corresponding to the logical address for the data operation; and determine, using the L2P table partition, the physical address for performing the data operation in the NAND array.

15. The SSD of claim 14, wherein the means for performing the data operation is configured to:

program second data to the NAND array to replace first data stored in the NAND array; and update the partition table and the L2P table partition to map the logical address to a physical address of the second data.

16. The SSD of claim 15, wherein the means for performing the data operation is further configured to:

update an L2P entry in the L2P table partition to store the physical address of the second data; and update an entry in the partition table to store a new location of the updated L2P table partition.

17. The SSD of claim 13, wherein the command comprises, at least one of:

a program command for writing data to a page of the NAND array; or a read command for reading data from a page of the NAND array.

18. The SSD of claim 13, wherein:

the partition table comprises a plurality of partition indexes, wherein each partition index indicates a location of a corresponding one of the L2P table partitions in the block-erasable NVM.

19. A solid state drive (SSD) comprising:

a NAND array;

a byte-rewritable non-volatile memory;

a block-erasable non-volatile memory (NVM) that has faster access than the NAND array; and a controller operatively coupled with the NAND array, the byte-rewritable non-volatile memory, and the block-erasable NVM, wherein the controller is configured to:

store first data in the NAND array using a two-stage logical-to-physical (L2P) mapping table comprising a partition table and a plurality of table partitions;

store the partition table in the byte-rewritable non-volatile memory, the partition table comprising a plurality of indexes corresponding to the plurality of table partitions; and store the plurality of table partitions in the block-erasable NVM, each table partition comprising a plurality of physical addresses of the NAND array mapped to logical addresses of the first data.

20. The SSD of claim 19, wherein the controller is further configured to:

store second data in the NAND array;

update one or more of the plurality of table partitions to store one or more physical addresses of the NAND array for storing the second data; and update one or more indexes of the partition table corresponding to the updated one or more table partitions.

21. The SSD of claim 19, wherein the controller is further configured to:

cache one or more of the table partitions in the byte-rewritable non-volatile memory.

* * * * *